United States Patent
Meylemans et al.

(10) Patent No.: US 8,661,515 B2
(45) Date of Patent: Feb. 25, 2014

(54) AUDIBLE AUTHENTICATION FOR WIRELESS NETWORK ENROLLMENT

(75) Inventors: Marc Meylemans, Beaverton, OR (US); Gary A. Martz, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 12/800,173

(22) Filed: May 10, 2010

(65) Prior Publication Data

US 2011/0277023 A1 Nov. 10, 2011

(51) Int. Cl.
*G06F 21/00* (2013.01)

(52) U.S. Cl.
USPC ............... 726/7; 713/150; 713/170; 713/171; 380/270; 455/41; 370/338; 704/245; 704/246; 704/247

(58) Field of Classification Search
USPC ........................................................ 726/5, 7
See application file for complete search history.

(56) References Cited

U.S. PATENT DOCUMENTS

| | | | |
|---|---|---|---|
| 5,450,524 A | | 9/1995 | Rissanen |
| 5,623,552 A * | | 4/1997 | Lane ............................ 382/124 |
| 5,945,656 A * | | 8/1999 | Lemelson et al. ....... 235/462.01 |
| 6,088,428 A | | 7/2000 | Trandal et al. |
| 6,144,848 A * | | 11/2000 | Walsh et al. .................. 455/419 |
| 7,349,481 B2 * | | 3/2008 | Steentra et al. ............... 375/260 |
| 7,562,288 B2 * | | 7/2009 | Dittrich ......................... 715/202 |
| 8,301,443 B2 * | | 10/2012 | Angell et al. ................. 704/231 |
| 2003/0220876 A1 * | | 11/2003 | Burger et al. ................... 705/50 |
| 2004/0203613 A1 * | | 10/2004 | Zhu et al. ................... 455/412.1 |
| 2006/0277043 A1 | | 12/2006 | Tomes et al. |
| 2007/0243887 A1 * | | 10/2007 | Bandhole et al. ............. 455/461 |
| 2007/0263577 A1 | | 11/2007 | Gallo et al. |
| 2007/0265006 A1 * | | 11/2007 | Washok et al. ............. 455/435.1 |
| 2008/0002882 A1 * | | 1/2008 | Voloshynovskyy et al. .. 382/181 |
| 2008/0113619 A1 * | | 5/2008 | Torrance et al. .............. 455/41.2 |
| 2008/0172491 A1 * | | 7/2008 | Chhabra et al. ............... 709/227 |
| 2009/0171851 A1 * | | 7/2009 | Beenau et al. ................... 705/72 |
| 2009/0228707 A1 * | | 9/2009 | Linsky .......................... 713/171 |
| 2009/0325491 A1 * | | 12/2009 | Bell et al. ..................... 455/41.3 |
| 2010/0146115 A1 * | | 6/2010 | Bezos ........................... 709/225 |
| 2010/0185444 A1 * | | 7/2010 | Olsen ............................ 704/246 |
| 2011/0295603 A1 * | | 12/2011 | Meisel .......................... 704/246 |

FOREIGN PATENT DOCUMENTS

| | | |
|---|---|---|
| WO | 2011/143235 A2 | 11/2011 |
| WO | 2011/143235 A3 | 3/2012 |

OTHER PUBLICATIONS

SmartWhisperlhttp://ieeexplore.ieee.org/stamp/stamp. jsp?tp=&arnumber=5439495|Poroor et al.|2009|pp.1-6.*
International Search Report and Written Opinion received for PCT Patent Application No. PCT/US2011/035949, mailed on Jan. 9, 2012, 10 pages.
International Preliminary Report on Patentability and Written Opinion received for PCT Patent Application No. PCT/US2011/035949, mailed on Nov. 22, 2012, 8 pages.

* cited by examiner

*Primary Examiner* — Mahfuzur Rahman
(74) *Attorney, Agent, or Firm* — Forefront IP Lawgroup, PLLC

(57) ABSTRACT

An audible authentication of a wireless device for enrollment onto a secure wireless network includes an unauthorized wireless device that audibly emits a uniquely identifying secret code (e.g., a personal identification number (PIN)). In some implementations, the audible code is heard by the user and manually entered via a network-enrollment user interface. In other implementations, a network-authorizing device automatically picks up the audible code and verifies the code. If verified, the wireless device is enrolled onto the wireless network.

16 Claims, 3 Drawing Sheets

AUDIBLE AUTHENTICATION FOR WIRELESS NETWORK ENROLLMENT

BACKGROUND

Wireless local area networks (WLANs) are becoming ubiquitous and populated by more than just personal computers. There is an emerging trend for consumer devices to become wireless and connect to WLANs. As wireless connectivity and availability increase for more devices and users, the security risks of unauthorized intruders also increase. However, increased security countermeasures often confuse unsophisticated wireless users.

Fortunately, some conventional user-friendly WLAN interoperable security approaches are available. For example, devices certified in accordance with Wi-Fi Alliance's certification standard (e.g., WI-FI CERTIFIED™) are able to interoperate with each other (regardless of the manufacturer of the device). Moreover, the Wi-Fi Alliance introduced the WI-FI PROTECTED SETUP (WPS) protocol that describes how secure WLANs may be setup and how certified new wireless devices may be added to these WLANs in a secure and user-friendly fashion.

With conventional, simplified, user-friendly device setup procedures (e.g., WPS), a user may add a new device onto a secure WLAN by manually entering a device-supplied personal identification number (PIN) via a user interface (UI) for network authorization. The device-supplied PIN acts as a shared secret between the new device and the existing secure WLAN.

However, some devices have their PINs printed on the devices (e.g. on a label). These PINs are less secure than PINs dynamically generated by other types of devices. Like a key to a lock that never changes, a printed PIN is a security risk. Also, one of the aims for the conventional secure network-enrollment procedures (e.g., WPS) is ease of use for the user. Unfortunately, the conventional procedures still require that the user perform crucial manual steps. For example, with WPS, the user must find and read the new device's PIN (which is typically 8-digits long) and then manually enter that 8-digit PIN into an authorizing UI for the existing secure network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
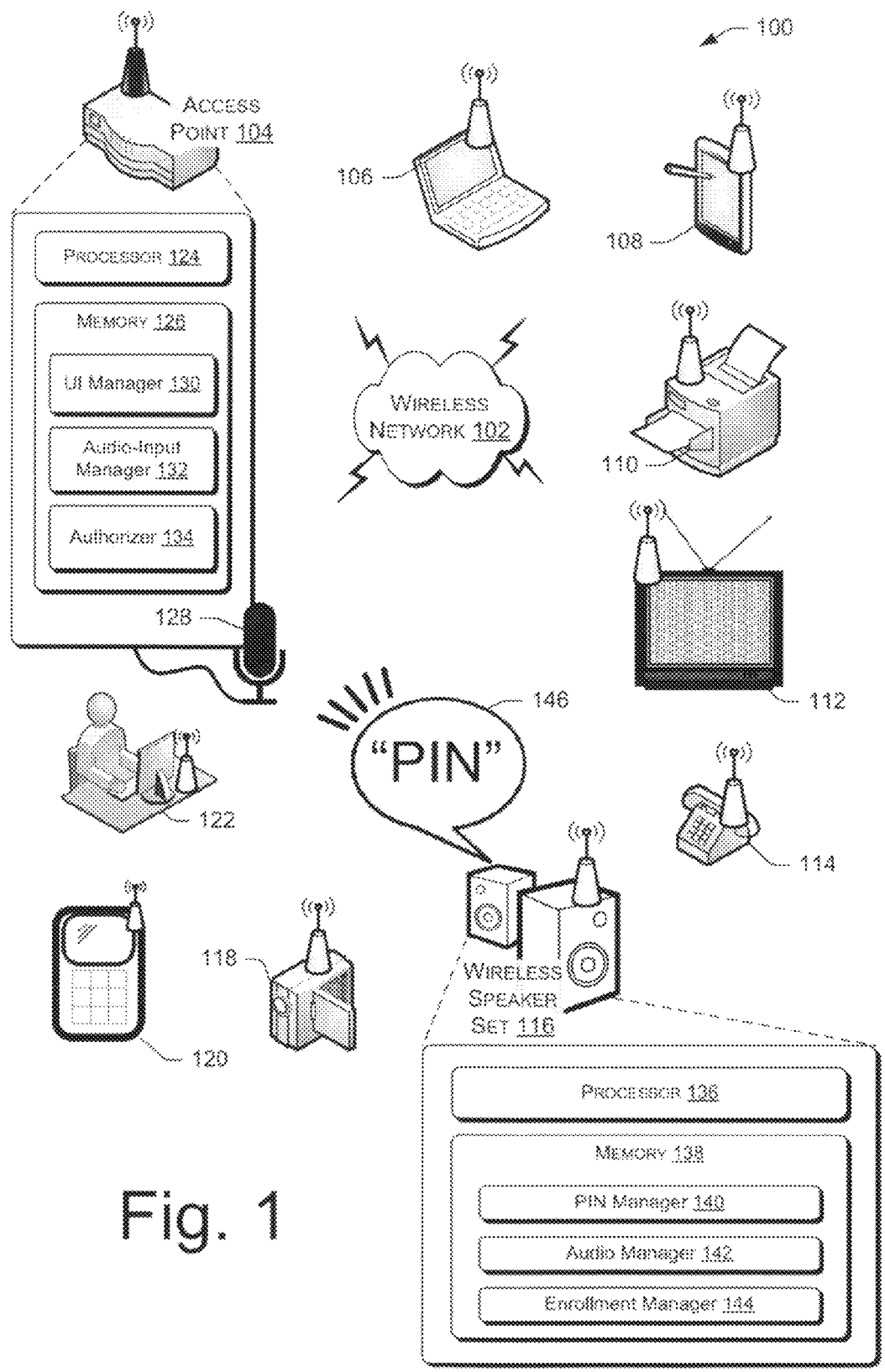
FIG. 1 illustrates an example networking environment with a secure wireless network within which the techniques described herein may be implemented.

Described herein are one or more techniques for using an audible authentication of a wireless device for enrollment onto a secure wireless network. With one or more described techniques, an unauthorized wireless device audibly emits a uniquely identifying secret code (e.g., a personal identification number or PIN). In some implementations, the audible code is heard by the user and manually entered via a network-enrollment user interface. In other implementations, a network-authorizing device (e.g., a wireless access point) automatically captures the audible code and verifies that code. The wireless device is enrolled onto the secure wireless network if the code is verified.

The described techniques operate as part of, and enhance the usability of, existing and future user-friendly, interoperable, secure network-enrollment approaches for wireless local area networks (WLANs). An example of an existing approach that is suitable for use with one or more implementations described herein is the Wi-Fi Alliance's WI-FI PROTECTED SETUP (WPS).

With conventional approaches (like WPS), a user confirms the enrollment of a new wireless device onto an existing secure WLAN by manually entering a device-supplied PIN. When the new device (e.g., a digital video camera) has a visual display, the device shows a dynamically generated PIN on that display to the user. For devices without displays, the conventional approach includes having the PIN printed on a label adhered to the device. The printed PINs are typically pre-generated and pre-printed by the device's manufacturer. While dynamically generated PINs are more secure than statically generated PINs, no conventional approach offers a way for devices without displays to present dynamically generated PINs to users during secure network-enrollment processes (like that offered by WPS). Also, conventional approaches are not accessible to and usable by visually impaired users.

With conventional approaches, after the user finds and reads the PIN on the label or on the device's visual display, the user enters the PIN via a user interface (UI) of an authorizing device (e.g., a wireless access point) or a UI of an already-enrolled device (e.g., a personal computer) acting on behalf of the authorizing device. Once enrolled on the WLAN, the new device communicates over the WLAN in a secure manner. The device-supplied PIN acts as a shared secret between the new device and the secure WLAN and the manual entry of the PIN is the action that shares that secret.

Unlike the conventional approaches, one or more implementations of the techniques described herein offer a way for devices without displays to have dynamically generated PINs, for accessibility for the visually impaired, and/or for enhancing the usability of the user-friendly, interoperable, secure network-enrollment approaches. With one or more of the techniques described herein, the devices without displays audibly emit dynamically generated PINs as part of the network enrollment process. For example, a device may play its PIN through speakers. In addition, the authorizing device (e.g. network access point) is equipped with a microphone to capture and interpret the device's audibly emitted PIN. Once interpreted, the authorizing device may proceed with the network enrollment process for the device that emitted the audible PIN. In this way, the user can avoid the manual and error-prone process of finding and reading the device's PIN and then manually entering that PIN for the device to be enrolled into the secure WLAN.

Example Wireless Network Environment

FIG. 1 illustrates an example wireless network environment 100. The example network environment 100 includes a wireless local area network (WLAN) 102, which may be communicatively linked to other networks (wired, wireless, cellular, satellite, etc.), such as the Internet or other WLANs. The network environment 100 also includes at least one wireless access point (AP) 104 and many other wireless stations (STAs) 106-122.

The AP 104 functions as an authenticator for the WLAN 102 and the AP may act as a bridge to other communicatively linked networks (not shown). The AP 104 may be a dedicated network device. Alternatively, it may be a multi-purpose device or general-purpose computing device. For example, the AP 104 may be a bridge, a router, a repeater, a server, a client, or any other network device that can also function as a wireless authorizing device for the WLAN 102. In some implementations, the network authentication function of the WLAN 102 may be shared between AP 104 and other network devices. Alternatively still, the AP 104 may delegate the network authentication function to other network devices.

As depicted, the stations or STAs (e.g., wireless devices) include a laptop computer 106, a tablet computer 108, a network printer 110, a networked television 112, a VoIP (Voice-over-Internet-Protocol) telephone 114, a wireless speaker set 116, a digital video camera 118, a mobile phone 120, and a personal computer 122 (shown with a user). Of course, STAs 106-122 are merely illustrative of the types of wireless devices that may be used in the context of the example wireless network environment 100. Other suitable wireless devices include (by way of example and not limitation): personal digital assistants (PDAs), digital music players, digital still cameras, office projectors, digital photo frames, smart phones, audio equipment, navigational systems, calculators, video equipment, telephones, home appliances, heating and/or cooling systems, consumer electronics, medical equipment, security systems, broadcast tuning equipment, on-demand access equipment, and the like.

In the example wireless network environment 100, the wireless speaker set 116 is not currently enrolled as part of the secure WLAN 102. The wireless speaker set 116 is seeking to enroll or join the WLAN 102. Devices seeking network enrollment, like wireless speaker set 116, are called "Enrollees" herein.

Like any other suitable wireless device and the AP 104, each of the STAs 106-122 is designed for use with existing or future user-friendly, interoperable, secure network-enrollment approaches for WLANs, like the WLAN 102. For example, STA 106-122 are designed to utilize Wi-Fi Alliance's WI-FI PROTECTED SETUP (WPS) to enroll devices onto a secure WLAN. Likewise, AP 104 is designed to use WPS to enroll new STAs onto the WLAN 102. Although not expressly shown in FIG. 1, each of the STAs 106-122 may include hardware, firmware, software, or a combination thereof that is configured to perform, at least in part, the techniques described herein.

The example WLAN 102 may be an infrastructure wireless network, but other implementations of WLAN may be used, such as a so-called "ad-hoc" network or Personal Area Network (PAN). The WLAN 102 conforms to one of the existing or forthcoming wireless local area networking standards. The Institute of Electrical and Electronics Engineers (IEEE) 802.11 standards (e.g., IEEE 802.11a, 802.11b, 802.11g, and 802.11n) are examples of suitable wireless local area networking standards for the techniques described herein. Generally, a suitable wireless network is one having networked devices designed for use with existing or future user-friendly, interoperable, secure network-enrollment approaches for secure wireless networks.

As depicted in FIG. 1, the AP 104 has components for implementing at least part of the techniques described herein. The AP 104 includes one or more processors 124, memory 126, and microphone 128. Residing in the memory 126 is one or more components that include a user-interface (UI) manager 130, an audio-input manager 132, and an authorizer 134.

Typically, the microphone 128 is integrally part of the AP 104. Alternatively, the microphone 128 may be external and wired to the AP 104. Alternatively still, the microphone 128 may connect to the AP 104 wirelessly and may be an already-enrolled device or part of an already-enrolled device on the WLAN 102. The microphone 128 is designed to be sensitive to a range of audio frequencies that devices are expected to emit. Those frequencies may include those within, above, and/or below the hearing range of a typical human.

The UI manager 130 manages a network-enrollment user interface (UI) presented to a user who is involved in an enrollment process of a new device. If the AP 104 has the capability to receive user input and generate the UI, the UI may be presented on the AP 104 itself. Typically, the UI is presented via a separate and already-enrolled network device, such as personal computer 122. The UI manager 128 handles the input from the user of the UI at the personal computer 122 and helps generate the output at that computer.

The audio-input manager 132 handles an analog audio input coming from the microphone 128. In particular, the audio-input manager 132 receives and recognizes audio input that is consistent with audibly emitted PINs from devices seeking network enrollment. The audio-input manager 132 converts the analog audio-inputted PIN into a computer-encoded form that the authorizer 134 can utilize. Herein, the computer-encoded PIN is stored and handled in a way that the value and meaning of the PIN is accessible and usable by computer components. For example, a computer-encoded form of PIN "13442GR3UT9" may be a string of characters or may stored as a floating-point value.

The authorizer 134 receives the computer-encoded PIN from the audio-input manager 132. The PIN acts as a shared secret between the Enrollee and the AP 104 (and/or some of the other existing devices on the secure WLAN). The authorizer 134 (e.g., the network registrar) confirms the veracity of the PIN. The authorizer 134 may verify, via cryptographic calculations, a table look-up, consultation with a trusted third party (for example, over an Internet connection), or other known verification processes. The Enrollee is denied enrollment if the PIN cannot be verified. Once the PIN is verified, the authorizer 134 initiates a network-enrollment procedure with the Enrollee that emitted the audible PIN. That network-enrollment procedure may include those done, for example, in accordance with WPS or other user-friendly, interoperable, secure network-enrollment approaches for secure wireless networks.

The example Enrollee is the wireless speaker set 116, which is a device without a display. Of course, the wireless speaker set 116 is just one example of a type of device that lacks an electronic output mechanism for visually presenting information to a user (especially when that information is supplied by an electrical signal). Herein, such devices are called "displayless." Examples of the kinds of visual displays that displayless devices do not have include (by way of example and not limitation): Electroluminescent displays (ELD); Light Emitting Diode (LED) displays; Cathode Ray Tube (CRT) displays; Liquid Crystal Displays (LCD); Plasma Display Panels (PDP); Organic Light-Emitting Diode (OLED) displays; Digital Light Processing (DLP) display; electronic paper; and non-video displays, like electromechanical displays.

As depicted in FIG. 1, the wireless speaker set 116 has components for implementing at least part of the techniques described herein. The wireless speaker set 116 includes one or more processors 136 and memory 138. Residing in the memory 138 is one or more components that include a PIN manager 140, an audio manager 142, and an enrollment manager 144. As illustrated, wireless speaker set 116 audibly emits a personal identification number (PIN) 146 shown in a word bubble.

The components of the wireless speaker set 116 and the components of the AP 104 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

The PIN manager 140 handles a unique network-enrollment PIN (e.g., a network-enrollment secret code) that would be understood and accepted by a network authorizer to identify and enroll the Enrollee onto the secure WLAN 102. The PIN manager 140 also provides that PIN to the audio manager 142 so that the wireless speaker set 116 may announce the PIN audibly. The PIN manager 140 may dynamically generate the PIN based upon a manufacturer-supplied formula. Alternatively, the PIN manager 140 may simply access a static PIN from the memory 138.

The unique network-enrollment PIN is associated with the Enrollee (e.g., the wireless speaker set 116) as part of the interoperable secure network-enrollment approach used by the WLAN 102 (e.g., WPS). The network-enrollment PIN may be unique to the particular network (e.g., the WLAN 102) that the Enrollee is attempting to join. In addition, the network-enrollment PIN may be a globally unique code (i.e., no other wireless device has this code anywhere). The network-enrollment PIN is typically a multi-digit number (e.g., 4-8 digits). Alternatively, the network-enrollment PIN may be a string of alphanumeric digits. Alternatively still, the network-enrollment PIN may include symbols and other codes associated with specific sounds, tones, or music.

The audio manager 142 receives the computer-encoded PIN from the PIN manager 140. The audio manager 142 converts the PIN from its computer-encoded format into an electrical signal that drives the speakers of the wireless speaker set 116. As a result, the wireless speaker set 116 audibly emits a sound, which is demonstrated by the "PIN" 146 shown in the word bubble.

The audible PIN 146 may be any reproducible sound, tone, music, or the like. Examples of the audible PIN 146 include (by way of example and not limitation): spoken words, letters and/or numbers (possibly in user-selectable languages), tones, clicks, beeps, notes, and music. The audible PIN 146 may be computer-generated by the audio manager 142. Alternatively, the audible PIN may be one or more stored files (e.g., digital audio file) retrieved from the memory 138 or a storage system and then played. The audible PIN 146 may be within, inside and/or outside the hearing range of a typical human. The audible nature of the audible PIN 146 is limited by an ability for the AP 104 to capture the audible PIN 146 with the microphone 128, and for the AP's audio-input manager 132 to be able to find correspondence to the original, unique network-enrollment PIN provided by the PIN manager 140 of the wireless speaker set 116.

The example Enrollee (e.g., the wireless speaker set 116) shown in FIG. 1 inherently has speakers to audibly emit the PIN. However, other types of Enrollees may be employed in other implementations. With the other implementations, the Enrollees have audio capability built into them by their manufacturer. For example, a wireless-device manufacturer may discreetly embed an integral speaker, may include a headphone jack, may offer a short-range networking scheme (e.g., BLUETOOTH™) to link to another audio device (e.g., mobile phone or earpiece), or may provide an option to link the Enrollee over the WLAN 102 to a networked device with a speaker.

The enrollment manager 144 handles the network enrollment procedure with the AP 104 once the authorizer 134 has confirmed the veracity of the network-enrollment PIN derived from the audible PIN 146. The enrollment manager 144 manages the provisioning of network credentials so that the wireless speaker set 116 becomes part of the secure WLAN 102. In general, the enrollment manager 144 performs network-enrollment procedures in accordance with WPS or with other user-friendly interoperable secure network-enrollment approaches for secure wireless networks.

Example Processes

Figure 2:
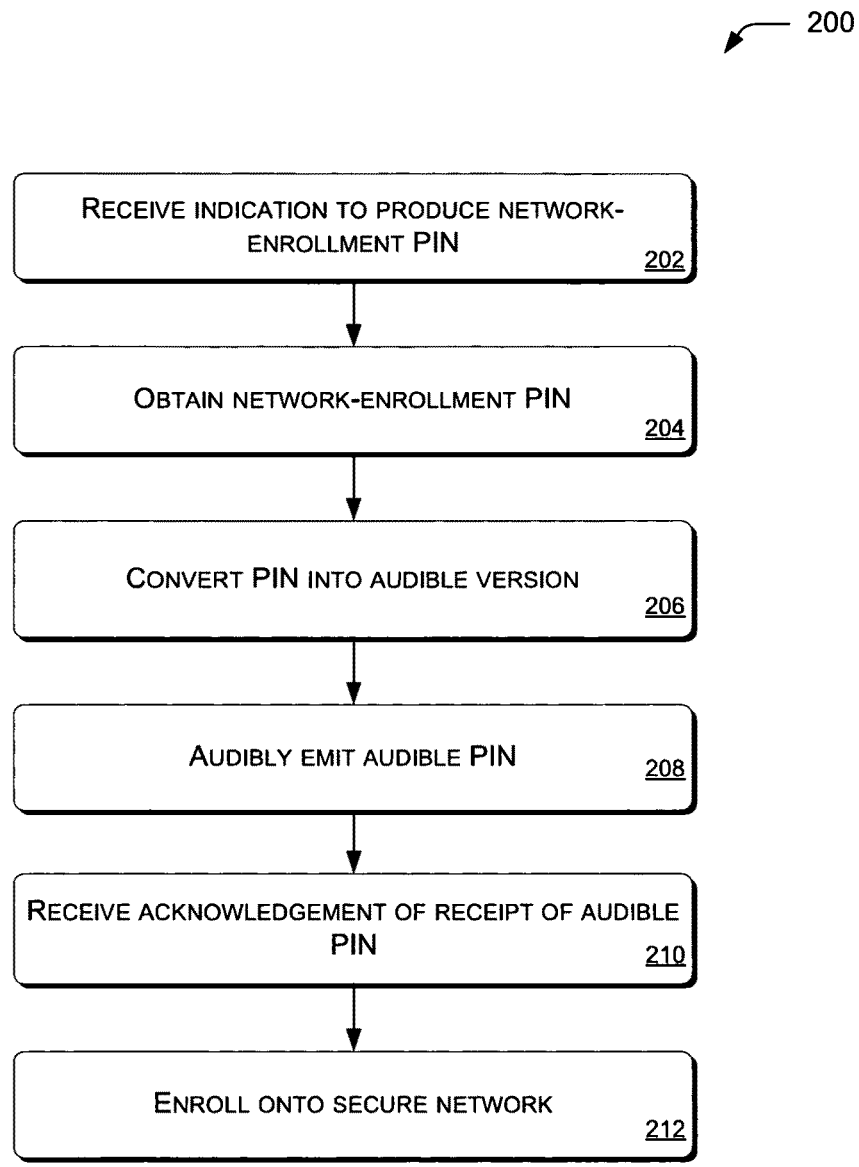
FIGS. 2 and 3 are flow diagrams of example processes for techniques for audible authentication for network-enrollment described herein.
Figure 3:
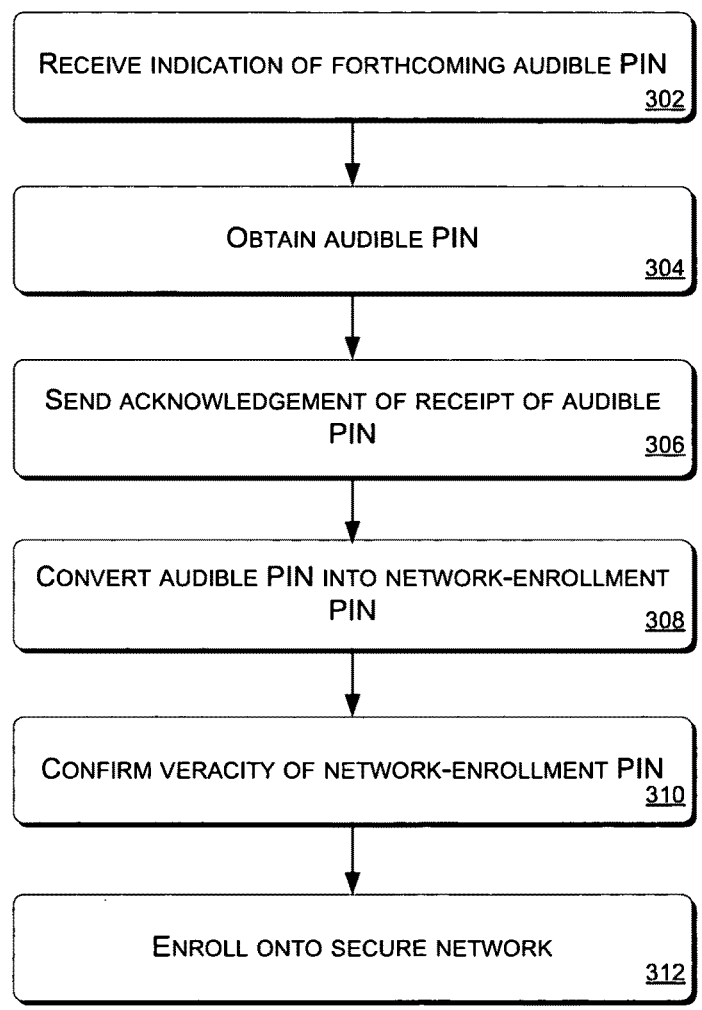

FIGS. 2 and 3 are flow diagrams illustrating example processes 200 and 300 that implement the techniques described herein for audible authentication for enrollment into wireless networks. Each of these processes is illustrated as a collection of blocks in a logical flow graph, which represents a sequence of operations that can be implemented in hardware, software, or a combination thereof. In the context of software, the blocks represent computer instructions that, when executed by one or more processors of such a computer, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

FIG. 2 illustrates the process 200 for a network Enrollee (e.g., the wireless speaker set 116 in FIG. 1) to share a secret code with a network authenticator (e.g., the AP 104) to facilitate enrollment in a secure wireless network (e.g., the WLAN 102). The example process 200 starts at operation 202 with the Enrollee receiving an indication to produce a unique secret code that identifies the Enrollee to network authenticators that participate in a common interoperability standard/approach for network-enrollment onto the secure wireless network. The secret code is unique across the secure wireless network and thereby uniquely identifies the Enrollee to the network's authenticator. Furthermore, the secret code may be globally unique and identifying. This means that no other Enrollee anywhere possesses the same secret code. The unique secret code is also called a personal identification number (PIN).

When the user activates an Enrollee, the Enrollee may search for wireless networks. When the Enrollee finds a network it wants to enroll in, the Enrollee may seek to join that network. Indeed, the un-enrolled network may indicate that the Enrollee should provide its PIN. Alternatively, a user may press a button on the Enrollee that directs the Enrollee to provide its PIN.

At operation 204, the Enrollee obtains a computer-encoded version of the PIN that uniquely identifies the Enrollee on the secure network or, alternatively, globally. Herein, the Enrollee may dynamically generate the PIN based upon a manufacturer-supplied formula and other known approaches for creating a uniquely identifying secret key. Alternatively, the Enrollee may simply access a static PIN from a memory (e.g., the memory 138) or a storage subsystem (e.g., disk or flash drive).

At operation 206, the Enrollee converts the obtained computer-encoded PIN into an electrical signal that is capable of producing an audible version of the PIN. For example, the electrical signal may drive the speakers of the wireless speaker set 116. The conversion involves a mapping of the digits of the obtained PIN into particular sounds. The sounds resulting from the conversion may be derived by a straight-forward mapping of computer-stored numbers or letters to their corresponding sounds in a particular language. In doing this, the Enrollee may dynamically produce the appropriate sounds for each digit. Alternatively, the Enrollee may access stored sounds from memory or storage based upon predetermined associations between the digits and the stored sounds. For example, with a PIN of "123," the Enrollee may access three sound files, one for each digit "1," "2,", and "3." Alternatively, the PIN may include human-understandable words and perhaps sentences.

Moreover, the Enrollee may have multiple sets of sounds where each set has sounds in a particular language. The user may choose a particular language (e.g., French) by selecting certain options on the Enrollee device (e.g., by pressing button and/or flipping switches). Default language may be set by the manufacturer based upon where the Enrollee is sold. Instead of human-understandable numbers, letters, and words, the sounds resulting from the conversion may not be part of a typical human language. For example, the digits of the PIN may map to tones, clicks, beeps, notes, music, blasts, animal sounds, sound effects, or other sounds that are not part of a typical human language.

Alternatively, instead of converting the computer-encoded version of the PIN (e.g., "134RG34FF2W99") into an audible version of the PIN, the Enrollee may retrieve from memory pre-generated audio versions of the PIN or of portions of the PIN. For example, the Enrollee may have stored in memory a digital audio file that, when played, emits the sound of a woman saying, "Red, Green, Blue, Eight, Nine, Thirty-one, Alpha, Tango, Ninety-one, Orange." The sounds of this recording may correspond to the appropriate network-enrollment PIN to the network authenticator that hears this sound or receives this input from a user using a network-enrollment UI.

At operation 208, the Enrollee audibly emits the PIN via speakers, like those of the wireless speaker set 116. This is demonstrated by the "PIN" 146 shown in the word bubble of FIG. 1. When the Enrollee does not have the built-in capability to produce sound, the Enrollee may perform an intermediate step to package and transmit the audible PIN to a device with a speaker. This may be done via a short-range networking scheme to link to another audio device (e.g., mobile phone or earpiece) or may be done by linking the Enrollee over some unsecured network to a networked device with a speaker.

At operation 210, the Enrollee awaits an acknowledgement that the network authenticator (e.g., the AP 104) has received and/or verified the audible PIN. The network authenticator may get the PIN via a microphone to pick-up the audible PIN. Alternatively, the authenticator may get the PIN via a user hearing the audible PIN and manually entering the PIN that the user perceived. There may be no express acknowledgement in some implementations. Instead, the initiation of the network enrollment process acts as an indirect acknowledgment that the PIN was received and verified.

At operation 212, the Enrollee joins the secure wireless network. This may include the Enrollee receiving network credentials from the network authenticator. Upon completion of the enrollment process, the Enrollee is an established wireless device on the secure wireless network.

FIG. 3 illustrates the example process 300 for a network authenticator (e.g., the AP 104) to acquire a secret code from a network Enrollee (e.g., the wireless speaker set 116 in FIG. 1) to facilitate the Enrollee's registration into a secure wireless network (e.g., the WLAN 102). The example process 300 starts at operation 302 with the authenticator receiving a unique secret code that identifies the Enrollee to the authenticator participating in a common interoperability standard/approach for network-enrollment onto the secure wireless network. The unique secret code is also called a personal identification number (PIN).

When the user turns on the authenticator or selects a seek option, the authenticator may search for Enrollees. When the authenticator finds an Enrollee, the authenticator asks the Enrollee if it wishes to join the secure network. Indeed, the authenticator may specifically request the Enrollee to provide its PIN. Alternatively, the authenticator may respond to an Enrollee's request to join the network or an indicator that the Enrollee will be sending its PIN. Alternatively still, the authenticator may receive a signal over the network or some audible code that indicates that the PIN is forthcoming. Furthermore, in some implementations, the authenticator might always be ready to capture an audible PIN.

At operation 304, the authenticator obtains an analog electrical signal via a microphone (e.g., microphone 128) of an audible PIN emitted by the Enrollee. This is demonstrated by the PIN 146 shown in the word bubble of FIG. 1 coming from the wireless speaker set 116 that is in proximity to the microphone 128. The range of the proximity depends upon many acoustical factors, such as volume of the audible PIN, sensitivity of the microphone 128, and possible interference from other sound sources (e.g., noise). Typically, the authenticator (e.g., the AP 104) and Enrollee (e.g., the wireless speaker set 116) are together in the same room when the PIN is audibly emitted.

At operation 306, the authenticator sends an acknowledgement to the Enrollee that the authenticator has received the audible PIN from the Enrollee. In some implementations, the authenticator might not send an express acknowledgement. Instead, the initiation of the network enrollment process acts as an indirect acknowledgment that the PIN was received and verified.

At operation 308, the authenticator converts the analog electrical signal into a computer-encoded version of the PIN. The authenticator's conversion involves a reverse mapping of the kind performed by the Enrollee in producing the audible PIN and discussed above, for example, with regard to the operation 206 of the process 200. The sounds of the audible PIN are mapped to the computer-encoded version of the PIN.

Alternatively, instead of receiving and converting the audible PIN, the authenticator may receive the computer-encoded version of the PIN via a human intermediary. In this situation, a user hears the audible PIN emitted by the Enrollee and manually entered the PIN into a UI of the authenticator. That UI may be part of the authenticator itself or it may be provided via another device on the network.

At operation 310, the authenticator confirms the veracity of the digital network-enrollment PIN. The authenticator may do this via cryptographic calculations, a look-up table, consultation with a trusted third party (for example, over an Internet connection), or other known verification processes. Instead of or in addition to the acknowledgement of operation 308, the authenticator may send an acknowledgement to the Enrollee that the authenticator has confirmed the veracity of the audible PIN from the Enrollee. In some implementations, the authenticator might not send an express acknowledgement. Instead, the initiation of the network enrollment process acts as an indirect acknowledgment that the PIN was received and verified.

Once the PIN is verified, the authenticator initiates, at operation 312, a network enrollment procedure with the Enrollee that emitted the audible PIN. This may include the authenticator sending network credentials to the Enrollee over the network. Upon completion of the enrollment process, the Enrollee is an established wireless device on the secure wireless network. If the PIN cannot be verified, then the authenticator denies the Enrollee admittance onto the secure wireless network. The authenticator may send a denial indication to the Enrollee via the network.

CONCLUDING NOTES

As used in this application, the terms "component," "module," "system," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of example, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. A method of audible authorization for enrollment onto a wireless network, the method comprising:
    requesting enrollment on a wireless network by a wireless device seeking to enroll onto a wireless network, the wireless device being as of yet unauthorized by the wireless network;
    in response to the requesting, receiving a denial of enrollment;
    in response to the receiving of the denial of enrollment:
        obtaining a secret code that uniquely identifies the wireless device;
        audibly emitting the secret code by the wireless device;
        in response to the audible emitting, receiving an acceptance of enrollment request over the wireless network by the wireless device;
        in response to receiving the acceptance of enrollment, enrolling the wireless device onto the wireless network;
    determining a language selection amongst multiple language available on the wireless device;
    converting a computer-encoded version of the secret code into an audible version of the secret code, wherein the audible version of the secret code is in a human language that corresponds to the determined language selection.

2. A method as recited in claim 1, wherein the wireless device lacks a visual display to display the secret code to a user.

3. A method as recited in claim 1, wherein the obtaining includes retrieving a computer-encoded version of the secret code stored in a memory of the unauthorized wireless device.

4. A method as recited in claim 1, wherein the obtaining includes dynamically generating a computer-encoded version of the secret code.

5. A method as recited in claim 1, wherein the obtaining includes retrieving a computer-encoded version of the secret code and the method further comprises converting the computer-encoded version of the secret code into an audible version of the secret code.

6. A method as recited in claim 1 further comprising receiving one or more network credentials for enrollment onto the wireless network.

7. A method as recited in claim 1 wherein the secret code identifies the wireless device globally.

8. A method of audible authorization for enrollment onto a wireless network, the method comprising:
    obtaining a secret code that uniquely identifies a wireless device seeking to enroll onto the wireless network, the wireless device being as of yet unauthorized by the wireless network;
    audibly emitting the secret code by the wireless device;
    in response to the audible emitting, receiving an acceptance of enrollment request over the wireless network by the wireless device;
    in response to receiving the acceptance of enrollment, enrolling the wireless device onto the wireless network, and
    determining a language selection based upon user input;
    converting a computer-encoded version of the secret code into an audible version of the secret code, wherein the audible version of the secret code is in a human language that corresponds to the determined language selection.

9. A method of audible authorization for enrollment onto a wireless network, the method comprising:
    obtaining an audible version of a personal identification number (PIN) that uniquely identifies a wireless device seeking to enroll onto the wireless network, the wireless device being as of yet unauthorized by the wireless network;
    converting the audible version of the PIN into a computer-encoded version of the PIN;
    confirming veracity of the computer-encoded version of the PIN;
    in response to confirming that the PIN is verified, initiating enrollment the wireless device onto the wireless network, and
    determining a language selection amongst multiple language available on the wireless device;
    converting the computer-encoded version of the PIN into an audible version of the PIN, wherein the audible version of the PIN is in a human language that corresponds to the determined language selection.

10. A method as recited in claim 9 further comprising, before the obtaining, receiving an indication that the audible version of the PIN is forthcoming.

11. A method as recited in claim 9 further comprising, after the obtaining, sending acknowledgement of receipt of the audible version of the PIN.

12. A method as recited in claim 9 further comprising, after the confirming, sending acknowledgement the audible version of the PIN has been verified.

13. A method as recited in claim 9 wherein the obtaining comprises capturing a sound audibly emitted by the unauthorized wireless device and storing the sound as the audible version of the PIN.

14. A wireless device comprising:
- a memory configured to store a computer-encoded version of a personal identification number (PIN) that uniquely identifies the wireless device when the wireless device seeks enrollment onto a wireless network;
- one or more speakers configured to audibly emit sound;
- a wireless communicator configured to wirelessly communicate with the wireless network;
- a PIN manager configured to obtain the computer-encoded version of the PIN stored in the memory, and determine a language selection amongst multiple language available on the wireless device;
- converting the computer-encoded version of the PIN into an audible version of the PIN, wherein the audible version of the PIN is in a human language that corresponds to the determined language selection
- an audio manager configured to convert the computer-encoded version of the PIN into an audible version of the PIN, wherein the audible version is in a human language that corresponds to the determined language selection, and to drive an audible emission of the audible version of the PIN through the one or more speakers;
- an enrollment manager operatively connected to the PIN manager, audio manager, and wireless communicator, the enrollment manager being configured to handle enrollment of the wireless device onto the wireless network, wherein the enrollment manager is further configured to:
    - request enrollment on the wireless network by the wireless device;
    - in response to the request, receive a denial of enrollment;
    - in response to receiving the denial of enrollment, trigger the PIN manager to obtain the PIN and the audio manager to convert the computer-encoded version of the PIN into the audible version of the PIN and to drive the audible emission of the audible version of the PIN through the one or more speakers;
    - in response to the audible emission, receive an acceptance of enrollment request over the wireless network by the wireless device;
    - in response to receiving the acceptance of enrollment, enroll the wireless device onto the wireless network.

15. A wireless device as recited in claim 14, the PIN manager being further configured to generate the computer-encoded version of the PIN.

16. A wireless device as recited in claim 14, wherein the wireless device lacks a visual display to display the PIN to a user.

\* \* \* \* \*